(12) United States Patent
Larsen

(10) Patent No.: US 10,661,644 B1
(45) Date of Patent: May 26, 2020

(54) UNSUPPORTED ULTRA-FLUSH GLASSRUN WEATHERSEAL ASSEMBLY

(71) Applicant: COOPER-STANDARD AUTOMOTIVE INC., Novi, MI (US)

(72) Inventor: Douglas C. Larsen, Highland, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 95 days.

(21) Appl. No.: 15/592,659

(22) Filed: May 11, 2017

Related U.S. Application Data

(60) Provisional application No. 62/334,663, filed on May 11, 2016.

(51) Int. Cl.
*B60J 10/76* (2016.01)
*B60J 10/16* (2016.01)
*B60J 10/17* (2016.01)
*B60J 10/34* (2016.01)
*B60J 10/26* (2016.01)

(52) U.S. Cl.
CPC ............... *B60J 10/76* (2016.02); *B60J 10/16* (2016.02); *B60J 10/17* (2016.02); *B60J 10/26* (2016.02); *B60J 10/34* (2016.02)

(58) Field of Classification Search
CPC ............. B60J 10/16; B60J 10/76; B60J 10/79
See application file for complete search history.

(56) References Cited

U.S. PATENT DOCUMENTS

| 4,496,186 | A | | 1/1985 | Tuchiya et al. |
|---|---|---|---|---|
| 4,561,211 | A | | 12/1985 | Raley et al. |
| 4,571,888 | A | | 2/1986 | Jensen |
| 4,614,061 | A | | 9/1986 | Brocke |
| 4,694,611 | A | | 9/1987 | Okumura |
| 4,800,681 | A | * | 1/1989 | Skillen ................... B60J 10/235 428/122 |
| 4,864,774 | A | * | 9/1989 | Onishi .................. B60J 10/235 49/440 |
| 5,014,464 | A | * | 5/1991 | Dupuy ..................... B60J 10/24 428/122 |
| 5,038,521 | A | | 8/1991 | Andrzejewski et al. |

(Continued)

FOREIGN PATENT DOCUMENTS

| DE | 28 27 372 A1 | 6/1990 |
|---|---|---|
| EP | 0 040 587 A2 | 11/1981 |

(Continued)

*Primary Examiner* — Justin B Rephann
(74) *Attorney, Agent, or Firm* — Fay Sharpe LLP

(57) ABSTRACT

A weatherseal assembly and associated method of forming same includes a generally U-shaped body including a base and first and second legs extending outwardly therefrom to form a glassrun cavity dimensioned to receive an associated window edge therein. First and second seal lips extend from the first and second legs, respectively, for engagement with opposed, first and second surfaces of the associated window. A first material is a stiffer, more rigid material than a second material that forms at least a portion of the second leg and the seal lips, such that at least a first portion of the first material forms the first leg extending outwardly from the base such that the first leg has a reduced thickness to provide a flush assembly of the weatherseal assembly, associated window and associated vehicle component.

20 Claims, 5 Drawing Sheets

(56) References Cited

U.S. PATENT DOCUMENTS

| | | | |
|---|---|---|---|
| 5,136,773 A * | 8/1992 | Mesnel | B60J 10/79 264/138 |
| 5,174,066 A | 12/1992 | Dupuy | |
| 5,233,758 A * | 8/1993 | Bielis | B60J 10/86 29/469.5 |
| 5,317,835 A * | 6/1994 | Dupuy | B60J 10/235 49/377 |
| 5,336,194 A | 8/1994 | Polaschegg et al. | |
| 5,566,510 A * | 10/1996 | Hollingshead | B29C 45/14409 49/475.1 |
| 5,590,926 A * | 1/1997 | Nozaki | B60J 10/248 156/71 |
| 5,605,736 A * | 2/1997 | Zohar | B60J 10/235 296/93 |
| 5,628,150 A * | 5/1997 | Mesnel | B60J 10/79 49/440 |
| 5,702,148 A | 12/1997 | Vaughan et al. | |
| 5,755,071 A * | 5/1998 | Drozd | B60J 10/246 428/122 |
| 6,023,888 A * | 2/2000 | Dover | B60J 10/79 49/441 |
| 6,030,022 A * | 2/2000 | Bormann | B60J 10/24 296/107.01 |
| 6,070,364 A * | 6/2000 | Berry | B60J 10/235 49/441 |
| 6,205,712 B1 * | 3/2001 | Ellis | B60J 10/79 49/377 |
| 6,213,536 B1 * | 4/2001 | Raisch | B60J 10/24 296/107.04 |
| 6,652,952 B2 * | 11/2003 | Drozd | B32B 15/08 428/122 |
| 6,679,003 B2 | 1/2004 | Nozaki et al. | |
| 7,086,201 B2 | 8/2006 | Struyven et al. | |
| 7,237,359 B2 | 7/2007 | Aritake et al. | |
| 7,631,923 B2 * | 12/2009 | Beierl | B60J 10/24 296/116 |
| 7,698,856 B2 | 4/2010 | Tamaoki et al. | |
| 7,763,197 B2 * | 7/2010 | Ellis | B29C 47/003 264/149 |
| 8,661,736 B2 * | 3/2014 | Roll | B60J 10/84 49/440 |
| 8,973,306 B2 | 3/2015 | Inaguchi | |
| 8,978,306 B2 * | 3/2015 | Prater | B60J 10/265 49/440 |
| 10,150,356 B2 * | 12/2018 | Takahashi | B60J 10/76 |
| 2003/0017302 A1 * | 1/2003 | Drozd | B32B 15/08 428/122 |
| 2005/0126077 A1 * | 6/2005 | Cittadini | B60J 10/38 49/377 |
| 2006/0086053 A1 * | 4/2006 | Ellis | B60J 10/16 49/441 |
| 2007/0068085 A1 | 3/2007 | Ninomiya et al. | |
| 2007/0137112 A1 | 6/2007 | Furuzawa et al. | |
| 2009/0064592 A1 * | 3/2009 | Takase | B60J 10/277 49/374 |
| 2009/0241430 A1 | 10/2009 | Knape | |
| 2012/0174491 A1 * | 7/2012 | Clark | B60J 5/0402 49/490.1 |
| 2013/0074417 A1 * | 3/2013 | Kawai | B60J 10/85 49/490.1 |
| 2013/0160375 A1 * | 6/2013 | Kuwabara | E06B 7/2303 49/490.1 |
| 2013/0232881 A1 * | 9/2013 | Adachi | B60J 10/16 49/490.1 |
| 2013/0340348 A1 * | 12/2013 | Matsuura | E06B 7/22 49/442 |
| 2015/0047264 A1 * | 2/2015 | Kobayashi | E06B 7/2303 49/440 |

FOREIGN PATENT DOCUMENTS

| | | |
|---|---|---|
| FR | 2 580 999 A1 | 10/1986 |
| GB | 2 371 070 A | 7/2002 |

* cited by examiner

UNSUPPORTED ULTRA-FLUSH GLASSRUN WEATHERSEAL ASSEMBLY

This application claims the priority benefit of U.S. provisional application Ser. No. 62/334,663, filed May 11, 2016, the entire disclosure of which is expressly incorporated herein by reference.

BACKGROUND

This disclosure relates to weatherstrip or weatherseal assemblies, and more particularly to a particular type of weatherseal assembly often referred to as a glassrun. As will be appreciated, however, selected aspects of the present disclosure may find application in related environments and applications.

The weatherseal assembly includes a generally U-shaped body dimensioned to receive an edge of a movable window. First and second seal lips extend outwardly from first and second legs, respectively, of the weatherseal assembly where the first and second legs extend substantially parallel to one another and further extend outwardly from a base of the weatherseal body. The seal lips form a sliding, sealing engagement with opposite, first and second faces of the associated vehicle window.

Prior commercial arrangements commonly form the weatherseal body of EPDM. Oftentimes, the EPDM is supported, i.e. an internal rigid member such as a metal support structure is provided, to add rigidity, stiffness, and strength to the weatherseal assembly. The EPDM is co-extruded around the support member and typically encapsulates the support. Unfortunately, these prior designs have a relatively thick outer leg that supports an outer seal lip extending from the outer leg for engaging the first, outer surface of the movable window of an associated vehicle. As a result, the outer surface of the window is spaced inwardly from the outer surface of the vehicle, which contributes to an irregular surface edge, inefficient aerodynamics, wind and drag noise, etc. In recent years, thermoplastics have also been used to form the same structure of the glassrun weatherseal assembly.

During production, the EPDM (which is a thermoset material) must proceed through a number of ovens during the manufacturing process. This causes issues with regard to creation of a desired final profile of the weatherseal, e.g. glassrun, and exposure to multiple ovens can potentially adversely impact resulting sealing capabilities of the weatherseal. Prior designs have a relatively thick outer leg that supports the outer seal lip. This results in the window outer surface forming a gap or inward space from the outer surface of the vehicle panel (e.g. pillar). In prior arrangements, the gap between the inner face of the vehicle body/pillar and the outer surface of the window is filled with the outer leg of the U-shaped body and the outer seal lip that extends from the outer leg for sliding, sealing engagement with the outer surface of the window.

Thus, a need exists for a more flush arrangement weatherseal assembly for both aesthetics/appearance as well as improved aerodynamics (e.g. wind noise, drag noise, etc.) without adversely impacting cost, ease of manufacture, performance, durability, etc.

SUMMARY

A weatherseal assembly includes a generally U-shaped body including a base and first and second legs extending outwardly therefrom to form a glassrun cavity dimensioned to receive an associated window edge therein. First and second seal lips extend from the first and second legs, respectively, for engagement with opposed, first and second surfaces of the associated window. A first material is a stiffer, more rigid material than a second material that forms at least a portion of the second leg and the seal lips, such that at least a first portion of the first material forms the first leg extending outwardly from the base such that the first leg has a reduced thickness to provide a flush assembly of the weatherseal assembly, associated window and associated vehicle component.

In a preferred embodiment, the thickness of the first leg is less than 2.5 mm.

In a preferred embodiment, a second portion of the first material also forms at least a portion of the base.

In a preferred embodiment, the second portion of the first material that forms at least a portion of the base is dimensioned to extend along a peripheral edge of the associated window.

In a preferred embodiment, the second portion of the first material that forms at least a portion of the base includes ridges formed therein.

In a preferred embodiment, the second leg includes a retention portion extending therefrom for engaging an associated shoulder of the associated vehicle component to retain the weatherseal body.

In a preferred embodiment, the retention portion is formed of the second material.

In a preferred embodiment, the first material has a generally L-shaped configuration forming the first leg and at least a portion of the base.

In a preferred embodiment, an adhesive for securing the first leg to the associated vehicle component may also be provided.

In a preferred embodiment, the body has an extrudable cross-sectional profile.

A method of forming a weatherseal assembly includes forming a body that has first and second legs extending from a base that together form a body cavity dimensioned to receive an edge of an associated window. The method also includes forming the first leg of a first material that is stiffer than a second material forming at least a portion of the second leg. The method further includes minimizing a thickness of the first leg to provide a flush assembly of the weatherseal assembly, associated window and associated vehicle component.

The body forming step may include coextruding the first material and second material.

The minimizing step in a preferred embodiment includes limiting a thickness of the first leg to less than 2.5 mm.

The body forming step may include extruding the first leg and at least a portion of the base from the first material.

The method may further include providing a retaining member extending from the body for engaging a shoulder of the associated vehicle component to retain the weatherseal body thereto.

The method may include forming the retaining member of the second material.

The method may include forming the first material into a generally L-shaped configuration forming the first leg and a portion of the base.

The method may include providing an adhesive for securing the first leg to the associated vehicle component.

The method may include extruding first and second seal lips on the first and second legs, respectively, for engaging opposite, first and second surfaces of the associated window.

The method may include providing a low friction coating on the first and second seal lips.

A primary benefit is the improved aesthetics.

Another advantage is associated with the improved aerodynamics.

Yet another benefit resides in the ease of substituting the present weatherseal assembly for the prior art arrangement.

Still other benefits and advantages of the present disclosure will become more apparent from reading and understanding the following detailed description.

DETAILED DESCRIPTION

Figure 1:
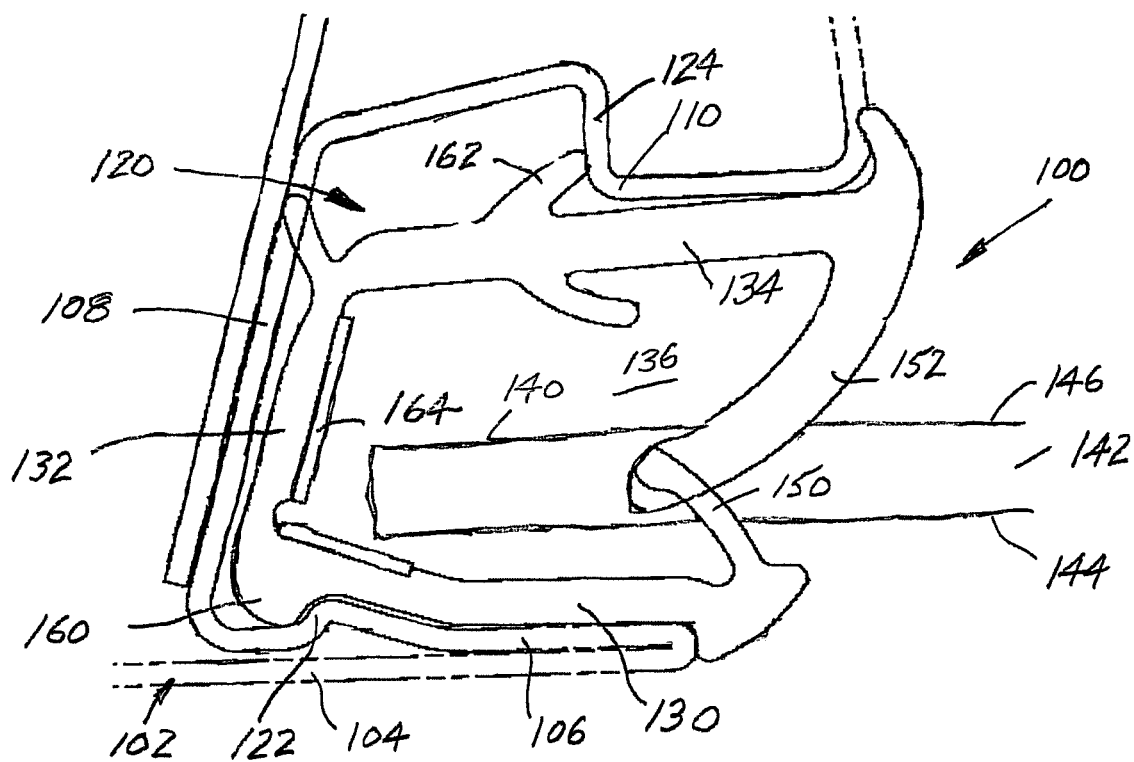
FIG. 1 is a cross-sectional view through a prior art glassrun weatherseal assembly.
Figure 2:
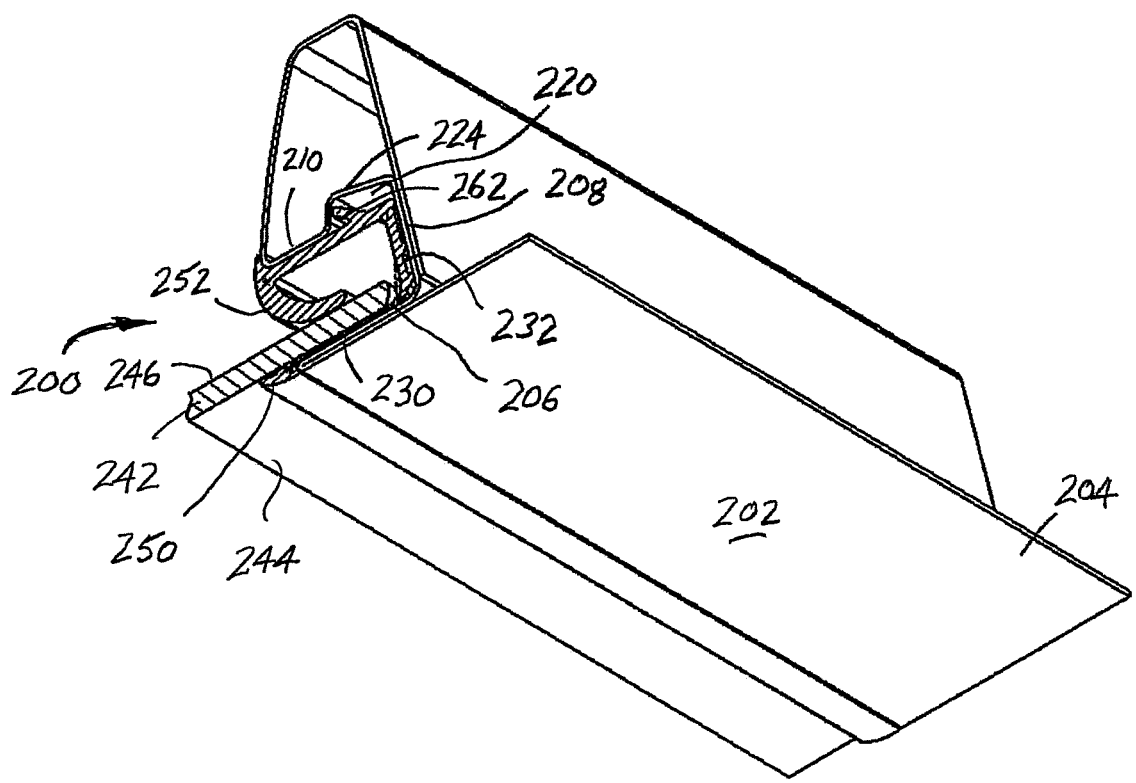
FIG. 2 is an isometric view of a new weatherseal assembly mounted in a vehicle component.
Figure 3:
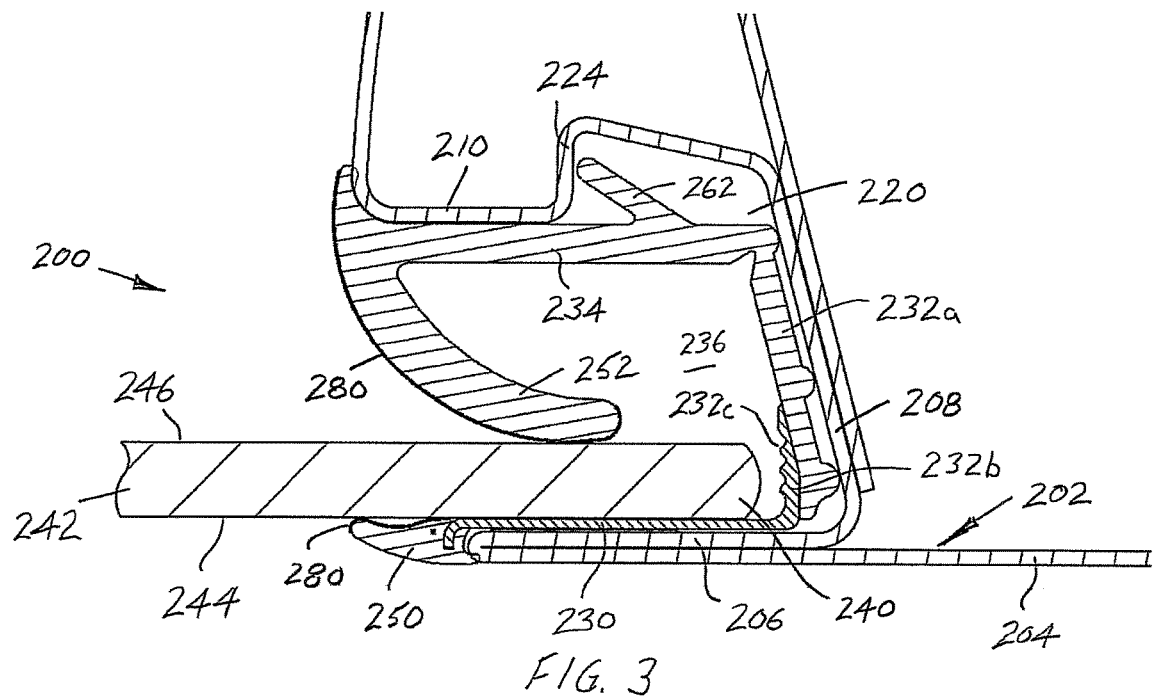
FIG. 3 is an enlarged cross-sectional view of the new weatherseal assembly and associated vehicle component and window.
Figure 4:
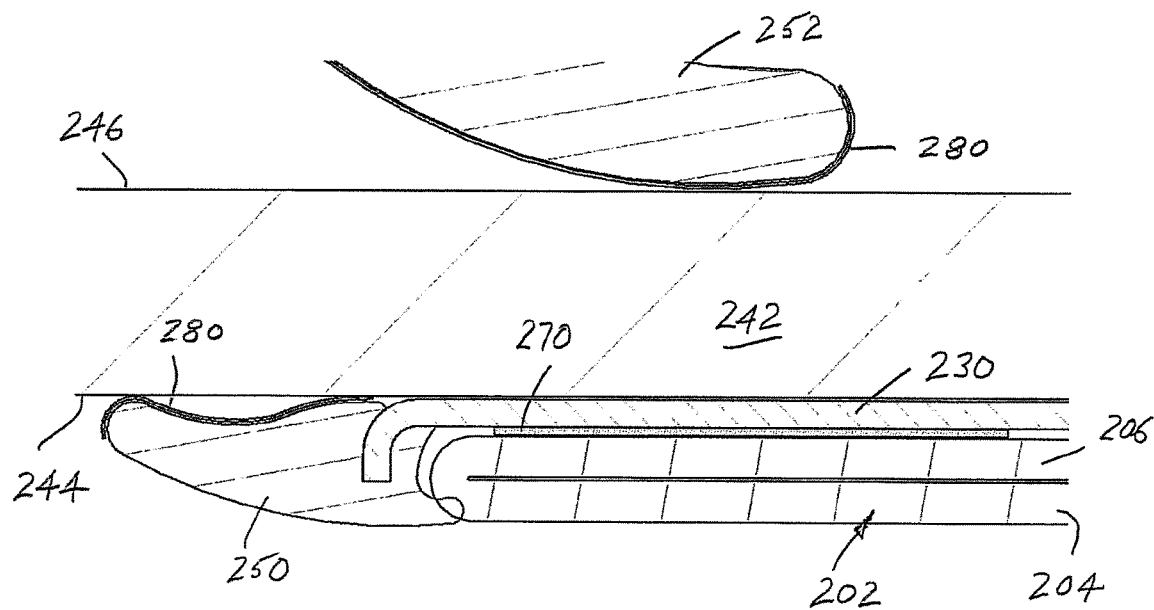
FIG. 4 is an enlarged view of the first leg of the weatherseal assembly peripheral edge of the window, and seal lips engaging opposite faces of the window.
Figure 5:
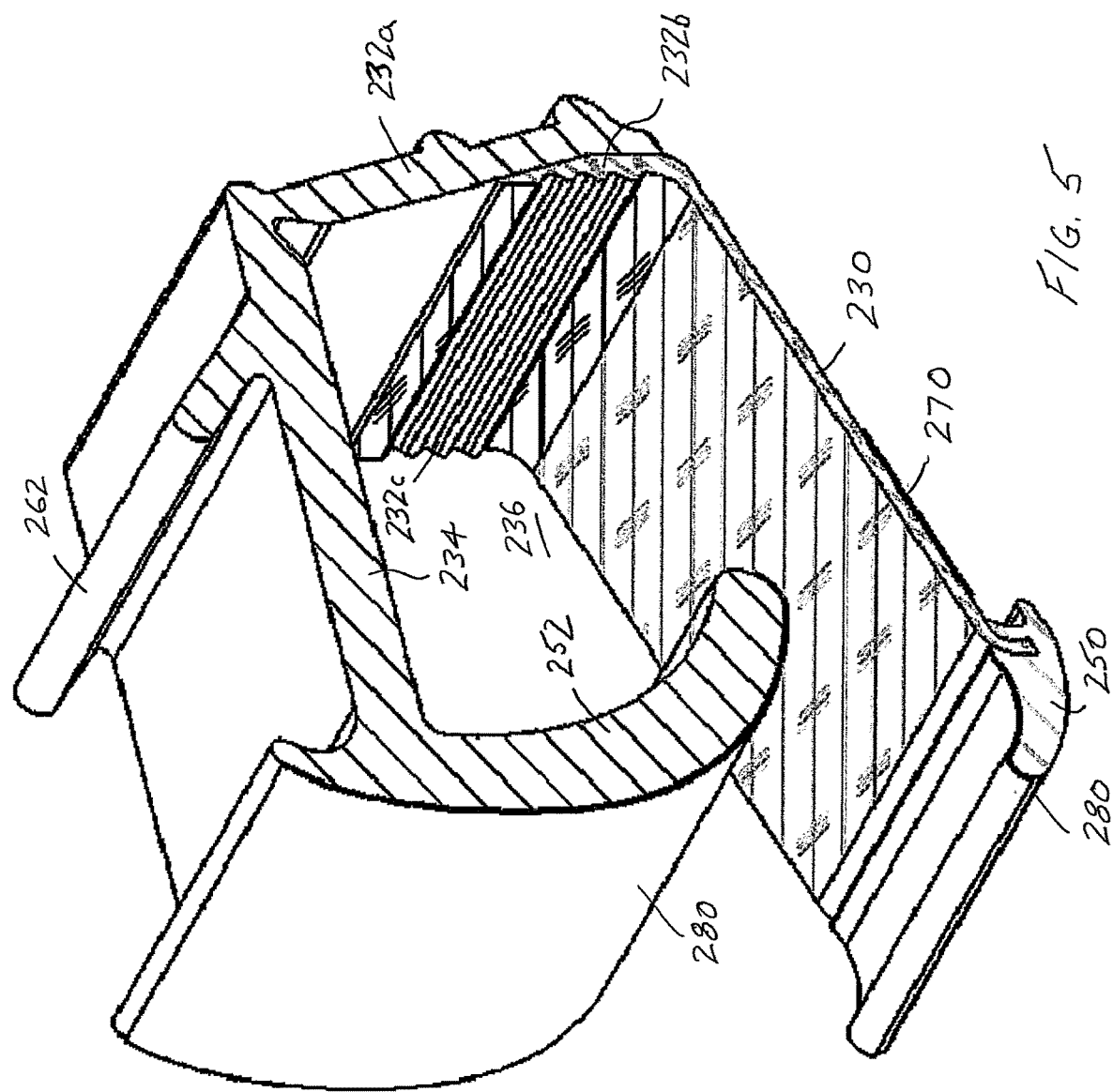
FIG. 5 is an enlarged perspective view of a sectional portion of the new weatherseal assembly.
Figure 6:
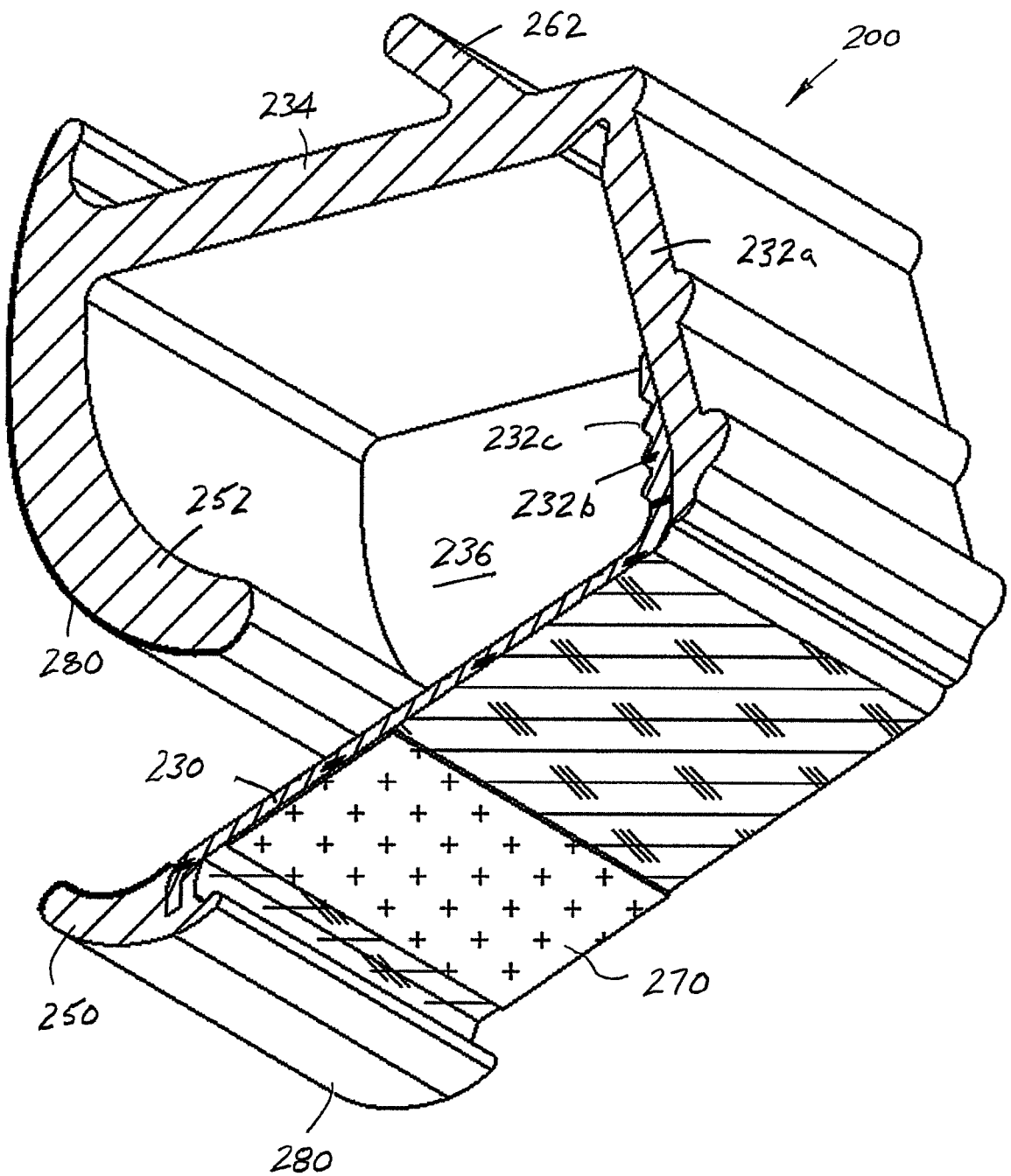
FIG. 6 is another enlarged perspective view of a sectional portion of the new weatherseal assembly.

FIG. 1 is an illustration of a prior art weatherseal assembly 100, particularly a glassrun weatherseal assembly. The weatherseal assembly 100 is received on an associated vehicle, and more particularly to a vehicle component such as a vehicle pillar or appliqué 102. The pillar 102 includes a planar outer, first portion 104 that folds back on itself along a planar inner, second portion 106. The second portion 106 merges into a base, third portion 108 and an inner or fourth portion 110 extends generally parallel to the first and second portions 104, 106 and likewise generally perpendicular to the third portion 108. Thus, vehicle body or pillar portions 106, 108, 110 form a cavity 120. Shoulders 122, 124 are provided in the second and fourth portions, respectively, of the vehicle component to retain the weatherseal assembly 100.

The weatherseal assembly 100 includes an outer, first leg 130, a base 132, and an inner, second leg 134 that together define a generally U-shape dimensioned for receipt in cavity 120 of the vehicle body. The first leg 130, base 132, and second leg 134, in turn, form a cavity 136 dimensioned to receive an edge 140 of movable window 142 (the window having an outer, first surface 144 and an inner, second surface 146). Primary seal lips 150, 152 extend inwardly into cavity 136 respectively from first leg 130 and second leg 134 of the weatherseal assembly 100. Specifically, seal lip 150 is adapted for sliding, sealing engagement with the outer, first surface 144 of the window 142 while the seal lip 152 is adapted for sliding, sealing engagement with the inner, second surface 146 of the window. Seal lips 150, 152 are shown in overlapping relation which is a typical illustration used in the industry to represent the original, manufactured orientation of the seal lips. One skilled in the art will recognize that the seal lips 150, 152 are bent or deformed for sliding, sealing engagement with the window 142 and that movement of the seal lips from the illustrated conformation exhibits a biasing force that enhances sealing engagement with the respective window surfaces 144, 146.

In addition, retention portions 160, 162 are provided on the respective first and second legs of the weatherseal assembly 100. The retention portions 160, 162 provide an interference fit with respective shoulders 122, 124 to secure the weatherseal assembly 100 in the cavity 120. Wear surface 164 may also be provided along an inner surface of the base 132 in a manner generally known in the art.

FIGS. 2-6 illustrate the weatherseal assembly 200 of the present disclosure. For purposes of brevity and consistency, like components will be identified by like reference numerals in the 200 series, e.g., weatherseal assembly 200 of FIGS. 2-6 generally corresponds to weatherseal assembly 100 of FIG. 1. Therefore, common components or portions of components that are substantially identical may not be described with specificity in connection with the new embodiment of FIGS. 2-6. Here, the vehicle component 202 is substantially identical although the second portion 206 of the vehicle component does not include a shoulder for purposes of retention for reasons which become more apparent below. The weatherseal assembly 200 includes a first leg 230, a second leg or base 232, and a third leg 234 dimensioned for receipt in the cavity 220 of the vehicle component. The first leg 230 is formed of a first material that is stiffer, more rigid than a second material that forms the second leg 234. In the illustrated embodiment, the seal lips 250, 252 and a first portion 232a of the base 232 are also formed from the second material. For example, it is contemplated that the first material is a stiff, semi-rigid olefin-based material having a low melt index that can be extruded such as polyethylene, polypropylene, or a cross-linked polyethylene. The second material is a thermoset or thermoplastic. Because of the stiffness/rigidity of this first material, a thickness of the first leg 230 is substantially reduced when compared to the thickness of a conventional first leg previously used in prior arrangements. The thickness of the first leg 230 is minimized and has a thickness as little as 0.1 mm (significantly reduced in thickness when compared to a prior art outer leg 130 having a thickness of 1.8 mm). Likewise the first leg 230/outer seal lip 250 combined dimension is significantly reduced, i.e., when combined with the outer seal lip 250, which is shown as up to and no greater than a combined thickness of 2.5 mm, and preferably about 2.0 mm. Again, this is a significant reduction over the thickness the prior art outer leg of the U-shaped body and the outer seal lip which together have a combined minimum thickness of 2.5 mm or greater. Thus, the combined thickness of the first leg 230 and the outer seal lip 250 provides for an ultra-flush construction with the outer surface of the vehicle component (pillar 204). The ultra-flush arrangement provided by the reduced thickness of the outer leg 230 of the glassrun weatherseal assembly 200 results in improved performance associated, for example, with improved aerodynamics, reduced wind noise or drag noise, and an improved appearance as a result of the minimal gap between the outer surface of the vehicle panel 204 and the outer surface 244 of the window 242.

The new embodiment of FIGS. 2-6 also provides that the first material may extend along at least a portion of the base 232. More specifically, base portion 232b is preferably a continuous extension from the first leg 230 and overlies and is coextruded with the first portion 232a of the base 232 that is formed from the second material. Moreover, the base portion 232b may include ridges or indentations 232c to limit the amount of surface area that actually contacts the perimeter edge 240 of window 242. Thus, it is preferred that the base portion 232b extend and overlap sufficiently with base portion 232a to limit the potential for contact between the perimeter edge of the window 242 and base portion 232a. Thus, the first material has a generally L-shape forming the entirety of the first leg 230 and also forming base portion 232b. In addition, seal lip 250 is coextruded with the first leg 230. It is also apparent, particularly in FIGS. 3 and 4, that the aerodynamic profile of the seal lip 250 is such that its overall thickness is substantially identical to the combined thickness of vehicle panel portions 204, 206 and the thickness of the first leg 230.

Retention portion 262 may be sufficient to retain the entire weatherseal assembly in the cavity 220 of the vehicle component. This, in part, is due to the fact that the L-shape of the first material adds additional stiffness or rigidity to the weatherseal assembly 200. It is contemplated, however, that an adhesive tape such as an acrylic tape 270 could also be provided if deemed necessary on the outer surface of the first leg 230 to additionally secure the first leg to the vehicle component (along an inner face of planar second portion 206).

All or select portions of the external surface of seal lips 250, 252 may include a low-friction coating 280. The low-friction coating 280 provides a surface having high lubricity that seals with surfaces 244, 246 of the window 242.

Moreover, forming integrated ridges 232c in the base portion 232b eliminates the need for the separate hard wear surface that is typically applied to an inner face of the base. It is also contemplated that the first leg 230 (and base portion 232b) could be a thin film material that is fed into an extrusion die, and onto which is extruded the second material.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept, or if they include equivalent structural elements with insubstantial differences.

What is claimed is:

1. A weatherseal assembly comprising:
   a generally U-shaped body including a base and first and second L-shaped legs, the first leg having a first portion that only partially overlaps with a first portion of the second leg to form the base of the U-shaped body, and the first and second legs each having a second portion extending outwardly from the first portions of the first and second legs, respectively, to form a glassrun cavity dimensioned to receive an edge of an associated window therein,
   first and second seal lips extending from the first and second legs, respectively, for engagement with opposed, first and second surfaces of the associated window; and
   the first leg formed entirely of a first material that is a stiffer/more rigid material than a different, second material that forms the entirety of the second leg and also forms the seal lips, such that at least a first portion of the first material forms the first leg extending outwardly from the base such that a combined thickness of the first leg and the first seal lip is less than 2.5 mm to provide a flush assembly of the weatherseal assembly and associated window.

2. The weatherseal assembly of claim 1 wherein the first portion of the first leg is dimensioned to extend only along a peripheral edge of the associated window.

3. The weatherseal assembly of claim 2 wherein the first portion of the first leg includes ridges formed therein.

4. The weatherseal assembly of claim 1 wherein the second leg includes a retention portion extending therefrom for engaging an associated shoulder of an associated vehicle component to retain the weatherseal body.

5. The weatherseal assembly of claim 4 wherein the retention portion is formed of the second material.

6. The weatherseal assembly of claim 1 wherein a cross-sectional thickness of the first leg is less than a cross-sectional thickness of the second leg.

7. The weatherseal assembly of claim 1 further comprising an adhesive for securing the first leg to the associated vehicle component.

8. The weatherseal assembly of claim 1 wherein the body has a cross-sectional profile capable of being extruded.

9. The weatherseal assembly of claim 1 wherein the second leg and second seal lip have a combined thickness greater than 2.5 mm.

10. The weatherseal assembly of claim 1 wherein the first and second legs extend parallel to one another, the first and second seal lips are formed of the second material and dimensioned to sealingly engage opposite, first and second faces of the associated window, and the base is formed in part of the both the first material and the second material, wherein the first material extends over an inner face of the base for engagement with the edge of the associated window.

11. The weatherseal assembly of claim 1 wherein the first material is an olefin-based material having a low melt index and the second material is either a thermoset or thermoplastic.

12. A method of forming a weatherseal assembly comprising:
    forming a body that includes first and second L-shaped legs, the first leg includes a first portion that overlaps with a first portion of the second leg to form a base, and the first and second legs each include a second portion extending from the base that together form a body cavity dimensioned to receive an edge of an associated window;
    forming the first leg entirely of a first material that is stiffer than a different, second material entirely forming the second leg;
    providing first and second seal lips on the first leg and the second leg, respectively, for sealingly engaging opposite first and second surfaces of the associated window; and
    dimensioning a combined thickness of the first leg and the first seal lip to be less than 2.5 mm to provide a flush assembly of the weatherseal assembly the associated window and an associated vehicle component which receives the weatherseal assembly.

13. The method of claim 12 wherein the body forming step includes coextruding the first material and second material.

14. The method of claim 12 wherein the body forming step includes extruding the first leg and at least a portion of the base from the first material, and the second leg and at least another portion of the base from the second material.

15. The weatherseal assembly of claim 12 further comprising providing an adhesive for securing the first leg to the associated vehicle component, and providing a retaining member extending outwardly from the second leg for retaining the second leg to the associated vehicle component.

16. The method of claim 15 further comprising forming the retaining member of the second material.

17. The method of claim 12 including extruding first and second seal lips on the first and second legs, respectively, for engaging opposite, first and second surfaces of the associated window.

18. The weatherseal assembly of claim 17 further comprising providing a low friction coating on the first and second seal lips.

19. The method of claim 12 further comprising dimensioning the second leg and the second seal lip to have a combined thickness greater than 2.5 mm.

20. The method of claim 12 further comprising forming the first material from an olefin-based material having a low melt index and forming the second material from either a thermoset or thermoplastic.

\* \* \* \* \*